Patented Dec. 21, 1943

2,337,464

UNITED STATES PATENT OFFICE

2,337,464

PREPARATION OF COMPOSITE RUBBER ARTICLES

Otto Hecht and Hans Prillwitz, Ludwigshafen-on-the-Rhine, and Ivo Dane, Leverkusen-Schlebusch, Germany; vested in the Alien Property Custodian No Drawing. Application October 4, 1940, Serial No. 359,744. In Germany September 18, 1939

6 Claims. (Cl. 154—43)

The present invention relates to improvements in the preparation of composite rubber articles.

It is known that the adhesive capacity of rubber or rubber mixtures can be improved by the incorporation therewith of certain resins such as colophony. This is true of natural rubber as well as of the various synthetic rubber-like materials.

It is the object of our present invention to develop a new adhesive agent which is capable of imparting to rubber or rubber mixtures a better adhesive capacity than can be achieved by means of the hitherto employed auxiliary agents, such as colophony. Other objects of our invention will be apparent from the following description and claims.

In the following the term "rubber" will have to be understood as comprising natural rubber as well as synthetic rubber-like materials, and compounded rubber mixtures as well as non-compounded materials, and also vulcanized products as well as non-vulcanized materials, unless otherwise stated. The term "composite rubber articles" is intended to include every article which consists of rubber wholly or in part and which has been built up by duplicating at least two layers or sheets or other articles of unvulcanized rubber. By the term "incorporating" we mean any manner of distributing a product within another medium either throughout the latter or only at the surface thereof.

The adhesive agents which have proved to be particularly suitable for the purpose in question and to be superior to the hitherto employed adhesive agents such as colophony may be defined as products of the interaction of acetylene and a mononuclear monovalent alkylated phenol. More particularly, we are working with such products as have been prepared from a mononuclear monovalent p-alkylated phenol, the alkyl group being preferably a tertiary one. As a matter of fact, the condensation products of the character described may be prepared from a mixture of several alkylated phenols. Thus, the products of the interaction of acetylene with a mixture of a preponderant amount of p-tertiary butylphenol (about 80%) and a minor amount of xylols (about 20%) have proved to be very suitable for the purpose in question. The molecular ratio between the phenol and the acetylene is preferably 1:0.3-2.5. The condensation products of the character described can be prepared for instance in the manner described in the U. S. Patents Nos. 2,027,199 and 2,072,825 to Walter Reppe and Ernest Keyssner by causing acetylene to react upon an alkylated phenol at a temperature between about 100°-300° in the presence of organic zinc or cadmium salts and/or organic nitrogenous bases, especially amines. The conditions of working will have to be chosen in such a manner that the resulting condensation products are not wholly insoluble in organic solvents. For practical purposes they should be soluble in aromatic or aliphatic hydrocarbons. Suitable alkylated phenols are in particular butylphenol, amylphenol and isododecylphenol. These condensation products if incorporated within unvulcanized rubber impart thereto a much better adhesive capacity than can be achieved by means of the same amount of colophony. Moreover, the mechanical properties of the resulting vulcanizates are much less affected by our new adhesive agents than by an equal amount of colophony. In consequence thereof, our invention allows one to work with a relatively high amount of adhesive agents, thus securing an excellent adhesive capacity of the rubber articles thus prepared and an excellent stability of the composite rubber articles built up therefrom, without running the risk of impairing the properties of the vulcanizates to any material extent.

The incorporation of our new adhesive agents within the rubber can be effected in various ways. Thus, they can be added to latex or to a latex-like emulsion of synthetic rubber-like materials, whereupon such latices can be used in the usual manner for instance by dipping or brushing. Furthermore, solutions of the said condensation products in organic solvents can be combined with solutions of natural or synthetic rubber, the resulting mixtures being likewise capable of being worked by dipping or brushing. In the case of emulsions as well as in the case of solutions the rubber may be provided with vulcanizing agents, vulcanization accelerators, filling agents and the like in any stage prior to working. In most cases the new adhesive agents are incorporated within the rubber by working a mixture thereof on the roller, it being preferred that the surface of the rubber sheets or layers prepared therefrom are contacted with a suitable solvent such as benzine prior to the pressing of one sheet onto another. Finally, a sufficient adhesive capacity can be brought about by spreading a solution of the said condensation products on at least one of the rubber surfaces to be duplicated. As a matter of fact, in the two latter cases the excess solvent must be evaporated prior to the building up operations.

As it follows from the foregoing paragraphs, a good binding effect can be achieved merely by incorporating our adhesives within only one of the rubber sheets to be united, though in general both sheets are provided therewith. Depending on the use to which the rubber is to be put it can be provided with vulcanizing ingredients and/or filling materials or not. In the unvulcanized state, our compositions (i. e., the mixture of unvulcanized rubber and the adhesive agent) can be employed, in the form of solutions or aqueous dispersions, for the preparation of strips or plasters which stick to each other but to no surface of any material other than rubber. In the case of vulcanizable rubber mixtures our adhesives serve to facilitate any building up operations, for instance in the preparation of tires, conveyor belts, boots, stuffings, rollers or hollow articles.

In accordance with what has been stated above our new invention can be applied to any kind of rubber. Besides natural rubber there are mentioned the various types of synthetic rubber-like materials. Examples for such products are the sodium and the emulsion polymerizates of butadiene hydrocarbons, furthermore, the polymerization products of halogenated butadiene such as 2-chlorobutadiene-1.3, and finally the products of the conjoined emulsion polymerization of butadienes with copolymerizable vinyl compounds such as styrene, acrylic ester nitrile, fumaric acid esters and the like.

The following examples illustrate the invention without restricting it thereto, the parts being by weight:

Example 1

This example illustrates the superiority of our condensation products over colophony as regards the adhesive capacity of a film of unvulcanized rubber. Into solutions of masticated natural rubber in benzene there are incorporated 20 per cent of colophony on the one hand and 20 per cent (calculated upon the rubber content) of a condensation product of the character defined below. Textile strips of a breadth of 2 cm. have been spread on with these solutions so as to be covered with a uniformly thick rubber film of a smooth surface. After drying for 5 minutes these films have been duplicated. Thereupon the time has been measured within which a weight of 1000 g. is sufficient to separate the composite strips for a length of 15 cm. The following table illustrates the time in seconds:

1. Natural rubber without adhesive agents___ 7.5
2. Natural rubber containing colophony____ 25
3. Natural rubber containing a product of the condensation of 1 mol of p-tertiary butylphenol and 1.3 mol of acetylene prepared in the presence of zinc naphthenate_____ 65

These figures are given by way of examples only, it being understood that a similar increase in adhesive capacity is to be observed in case the natural rubber is replaced by various synthetic rubber-like materials such as polymeric 2-chlorobutadiene-1.3 or polymeric butadiene hydrocarbons.

Example 2

This example illustrates that a similar result is achieved in case the unvulcanized natural rubber is replaced by a vulcanizable mixture containing a synthetic rubber-like material. A mixture of the following composition:

| | Parts |
|---|---|
| A synthetic rubber prepared by the emulsion polymerization of 70 per cent of butadiene and 30 per cent of styrene, this product having been plastified by exposing the same to an oxydizing treatment in the presence of anti-oxidants__ | 100 |
| Zinc oxide_____ | 24. |
| Carbon black_____ | 7.5 |
| Tetrahydronaphthalene _____ | 3 |
| A brown coal tar-distillate_____ | 2 |
| Sulfur _____ | 1.8 |
| Benzothiazol-2-sulfendiethylamide _____ | 0.85 | has been tested without any adhesive agents (test A), with the addition of 5 parts of colophony (test B) and finally with the addition of 5 parts of a product of the condensation of 1 mol of isododecylphenol and 1.5 mols of acetylene prepared in the presence of zinc isododecylphenoxy butyrate of 180° C. (test C). The tests have been performed by cutting these mixtures into strips of a breadth of 2 cm., contacting these strips with benzine and, after a 5 minutes' drying, pressing two surfaces together for a length of 1.5 cm. After a 5 hours' storing the weight has been measured which is necessary for tearing apart such strips. The following table shows the tests, the right hand column illustrating the weight in kg.:

A_____ 4.2
B_____ 5.1
C_____ 8.3

Also in this example the said synthetic rubber-like material can be replaced by natural rubber or other synthetic rubber-like materials.

Example 3

This example serves to illustrate that a smaller amount of our condensation products than of colophony is sufficient for reaching the same degree of adhesive capacity, the tests having been performed with the vulcanizable composition which is described in the foregoing example. In test A the said mixture has been employed without any adhesive agent, in test B with the addition of 10 per cent of colophony (calculated upon the rubber content) and in test C with the addition of 2.5 per cent of the condensation product described in the foregoing example. The following table shows the tensile strength in kg., the tests having been performed as described in Example 2.

A_____ 4.2
B_____ 6.1
C_____ 6.0

Example 4

This example illustrates the superiority of our condensation products over colophony as regards the mechanical properties of composite vulcanized rubber articles. A composition as described in Example 2 has been vulcanized without any adhesive agents (test A), furthermore with the addition of 5 per cent of colophony (test B) and finally with the addition of 5 per cent of a product of the condensation of 1 mol of cresol and 1.3 mols of acetylene prepared in the presence of zinc acetate at 160–185° C. (test C), the vulcanization having been performed by a 45 minutes' heating at 2.1 atmospheres overpressure. The following table illustrates the mechanical properties of the resulting vulcanizates, column $a$ showing the tensile strength in kg. per cm.$^2$, column $b$ the elongation in per cent, column $c$ the permanent set in per cent and column $d$ the weight at an elongation of 300 per cent:

| | a | b | c | d |
|---|---|---|---|---|
| A | 68 | 585 | 8 | 16 |
| B | 54 | 875 | 18 | 8 |
| C | 75 | 660 | 10 | 14 |

Example 5

This example illustrates the use of our adhesive agents in form of a solution in an organic solvent by spreading the same on the surface of the rubber mixture to be duplicated. Textile materials covered with a film of a vulcanizable synthetic rubber mixture (see Example 2) have been cut into strips of a breadth of 2 cm and duplicated without an adhesive (test A), furthermore with colophony (test B) and finally, with a product of the condensation of acetylene and p-tertiary butylphenol as described in Example 1, the colophony and the said condensation product having been applied to the rubber mixture in form of a 3 per cent solution in a mixture of benzine and toluol. The following table shows the time in seconds which has been measured as described in Example 1:

A ---------------------------------------- 10
B ---------------------------------------- 20
C ---------------------------------------- 120

Instead of the said solutions of the adhesive agents there can also be employed solutions containing natural or a synthetic rubber besides the adhesive agents.

*Example 6*

This example illustrates the effect which is brought about by the method as described in the foregoing example after vulcanization.

Sheets of the vulcanizable synthetic rubber mixture of Example 2 are spread on with a 3 per cent solution of the product of the condensation of p-tertiary butylphenol and acetylene as described in Example 1 (test A) or with colophony (test B) in a mixture of benzine and toluol. After a 15 minutes' drying the sheets have been duplicated and vulcanized. In a third experiment (test C) the sheets have been duplicated and vulcanized under the same conditions but without adhesive agents. After vulcanization the plates have been cut into strips of the breadth of 2 cm. From an investigation of several such strips taken from different parts of the composite article there can be calculated how many per cent of the surface of one sheet adheres to the surface of the other sheet. The following table shows the result, the right hand column illustrating the percentage:

A ---------------------------------------- 100
B ---------------------------------------- 50
C ---------------------------------------- 0

We claim:

1. Composite rubber articles containing as a binding agent for securing adhesion of rubber onto rubber a product of the interaction of acetylene and a mononuclear monovalent alkylated phenol in which the molecular ratio between the phenol and the acetylene is substantially 1:0.3–2.5.

2. Composite rubber articles containing as a binding agent for securing adhesion of rubber onto rubber a product of the interaction of acetylene and a mononuclear monovalent p-alkylated phenol in which the molecular ratio between the phenol and the acetylene is substantially 1:0.3–2.5.

3. Composite rubber articles containing as a binding agent for securing adhesion of rubber onto rubber a product of the interaction of acetylene and a mononuclear monovalent p-tertiary alkylphenol in which the molecular ratio between the phenol and the acetylene is substantially 1:0.3–2.5.

4. Composite rubber articles containing as a binding agent for securing adhesion of rubber onto rubber a product of the interaction of acetylene and p-tertiary butylphenol in which the molecular ration between the phenol and the acetylene is substantially 1:0.3–2.5.

5. Rubber tires containing as a binding agent for securing adhesion of rubber onto rubber a product of the interaction of acetylene and a mononuclear monovalent alkylated phenol in which the molecular ratio between the phenol and the acetylene is substantially 1:0.3–2.5.

6. Conveyor belts of rubber of a composite structure containing as a binding agent for securing adhesion of rubber onto rubber a product of the interaction of acetylene and a mononuclear monovalent alkylated phenol in which the molecular ratio between the phenol and the acetylene is substantially 1:0.3–2.5.

OTTO HECHT.
HANS PRILLWITZ.
IVO DANE.